Dec. 15, 1970        THOMAS O'D. CONNOLLY        3,546,863
               PICK-UP REEL FOR HARVESTING MACHINERY
Original Filed Feb. 17, 1966                     3 Sheets-Sheet 1

INVENTOR.
THOMAS O'D. CONNOLLY
BY
Gardner & Zimmerman
ATTORNEYS

Dec. 15, 1970     THOMAS O'D. CONNOLLY     3,546,863
PICK-UP REEL FOR HARVESTING MACHINERY
Original Filed Feb. 17, 1966     3 Sheets-Sheet 2
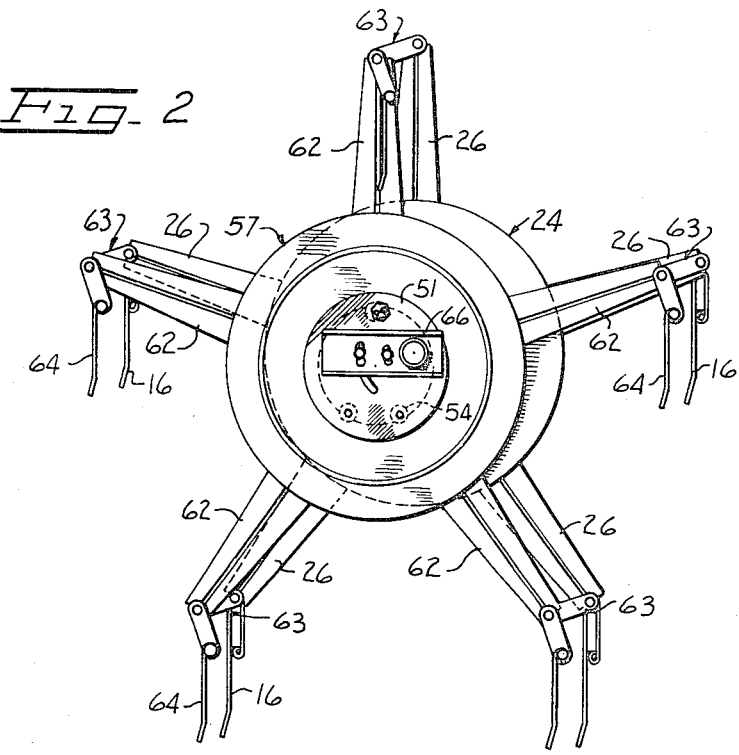
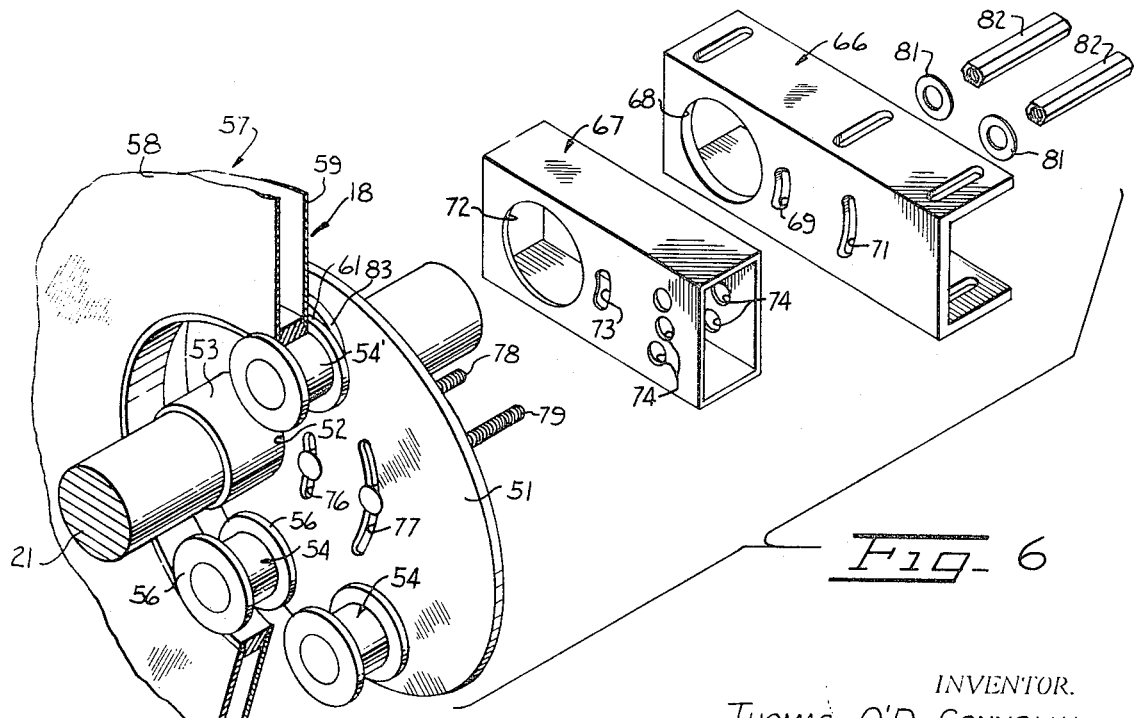
INVENTOR.
THOMAS O'D. CONNOLLY
BY
Gardner & Zimmerman
ATTORNEYS

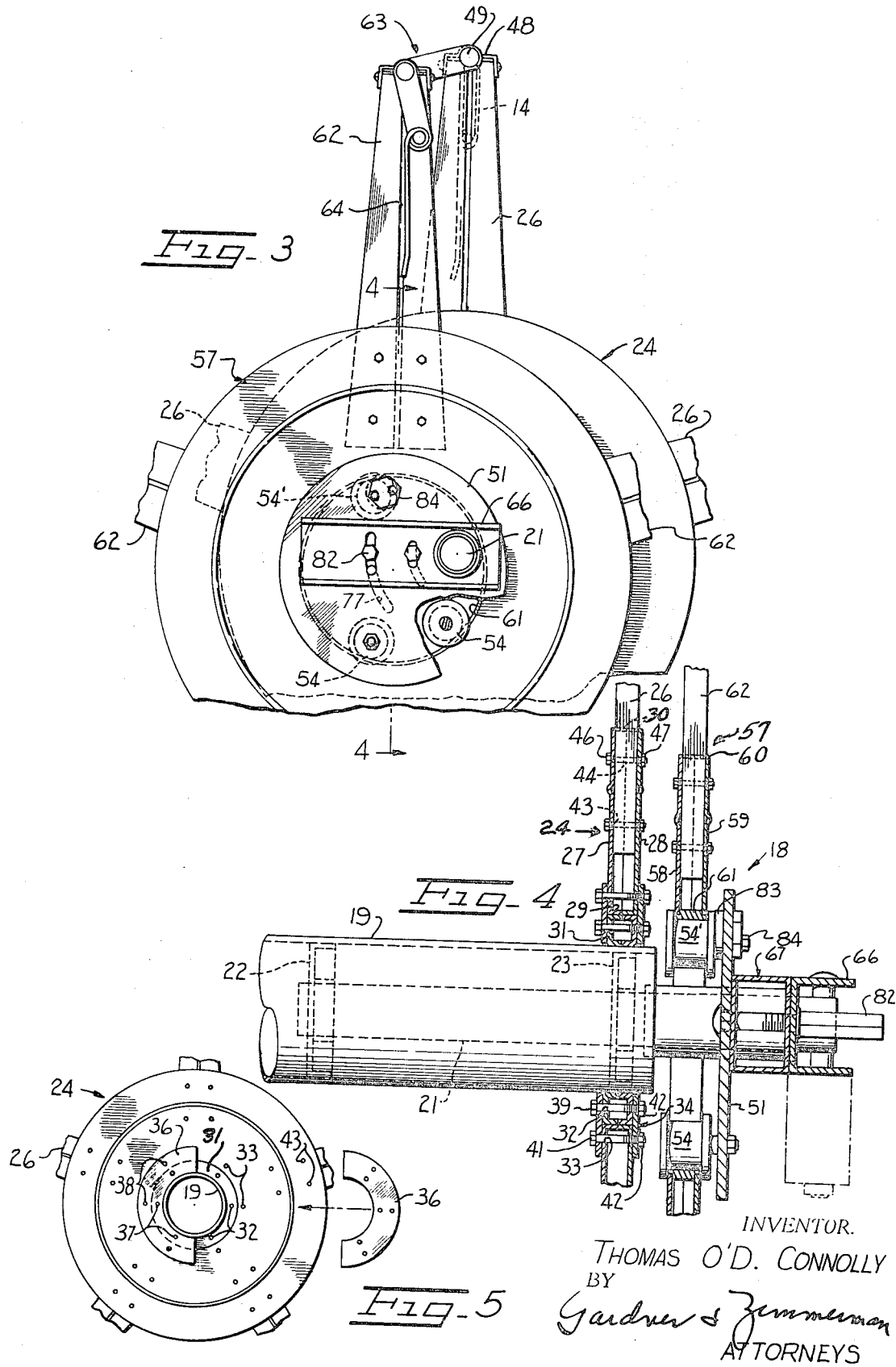

United States Patent Office 3,546,863
Patented Dec. 15, 1970

3,546,863
PICK-UP REEL FOR HARVESTING MACHINERY
Thomas O'D. Connolly, Stockton, Calif., assignor to Universal Harvester Co., Inc., Stockton, Calif., a corporation of California
Continuation of application Ser. No. 528,146, Feb. 17, 1966. This application Apr. 30, 1969, Ser. No. 820,683
Int. Cl. A01d 57/02
U.S. Cl. 56—226
12 Claims

ABSTRACT OF THE DISCLOSURE

A pick-up reel for harvesting machinery is described which is free of external polygon bracing and other elements which would obstruct the feed-through of a crop to the harvester cutter bar and beat and shatter the seed heads, but which is structurally strong and rigid. The pick-up reel includes a metallic tubular axle which has a plurality of annular reel hubs rigidly coaxially secured thereto at longitudinally spaced positions. Each of the reel hubs is of a dual disc construction in which a pair of spaced parallel annular discs are coaxially mounted on the tubular axle and have annular webs extending right angularly therebetween to provide a rigid hub structure. A plurality of circumferentially spaced metallic reel arms project radially outward from between the spaced discs of each of the reel hubs with corresponding ones of the arms of the respective hubs being longitudinally aligned. A plurality of bats from which crop rake fingers project are pivotally mounted at the tips of the aligned ones of the arms for movement about longitudinal axes. An eccentrically mounted control hub is provided for rotation with the reel hubs and is so connected to the bats that it pivots the same during the rotation of the pick-up reel to maintain a selected positional inclination of the rake fingers.

CROSS REFERENCE TO RELATED APPLICATION

This application is a continuation of my copending application Ser. No. 528,146, filed Feb. 17, 1966, and now abandoned.

This invention relates to harvesting machinery such as swathers, combines, and the likes, and is more particularly directed to an improved pick-up reel therefor.

Swathers, combines, and equivalent harvesting machinery typically include relatively large reels for gathering the crop and feeding it into a cutter bar. These reels are generally of two types, one called bat reels, and the other called pick-up reels. Manufacturers of combines and swathers commonly equip the machines with bat reels since they are much lighter and less expensive than the pick-up reels. However, in view of the more efficient operation of the pick-up reels in most instances, the purchasers of the machine will replace the bat reels with a pick-up reel. Both types of reels are provided with a plurality of circumferentially spaced bats carried in radially outwardly spaced parallel relation to the rotational axis of the reel, however the pick-up type of reel has fingers projecting from the bats, and the latter and the fingers are maintained in a particular positional relation with respect to the vertical during the rotation. As the pick-up reel rotates, the bats and fingers successively sweep down into the crop to gather and urge same through the reel against the cutter bar to effect cutting. Heretofore, the reels have included internal bracing structure which has impeded the free, undisturbed flow of the crop through the reel to the cutter. Such internal structure in its rotation beats and shatters the seed heads such that a substantial amount of the seeds are not fed into the harvesting machinery, but rather are dropped in the field and lost. Additional limitations and disadvantages of conventional pick-up reels include their relatively flimsy construction, susceptibility to wear, and their manner of construction which is not conducive to ready assembly and disassembly.

It is therefore an object of the present invention to provide an improved pick-up reel for swathers, combines, and the like, which is arranged to effect an unobstructed feeding action of the crop to the cutter bar so as to significantly minimize the amount of seed wastefully dropped in the field.

Another object of the invention is the provision of a pick-up reel of the class described characterized by an open internal construction free of bracing and other elements which would obstruct the feed-through of the crop to the cutter bar and beat and shatter the seed heads.

Still another object of the invention is the provision of a pick-up reel which, while being free of truss rods and external polygon bracing, is yet structurally very strong and rigid.

It is still another object of the invention to provide a pick-up reel of the class described having a rigid metallic tubular axle extending the entire length thereof and a plurality of dual disc hubs rigidly secured at longitudinally spaced positions to each supporting a plurality of radially projecting drive arms for carrying circumferentially spaced bats in parallel relation to the reel axis.

A further object of the invention is the provision of a pick-up reel of the class described having eccentric control plates with rollers positively engaging machined control tracks formed in control hubs coupled to the bats to control their orientations during reel rotation in such manner that the bats and fingers carried by the bats are maintained at all times vertical or in any other selective position relative to the vertical.

A still further object of the invention is to provide a pick-up reel of the character outlined above, wherein provision is made for adjustment of the aforesaid rollers to compensate for wear.

Another object of the invention is the provision of a pick-up reel of the class described which includes means for adjusting the position of the rotational axis of the control hubs over a relatively wide angle to change the angular relationship which the bats and fingers will maintain in relation to the vertical during rotation of the reel.

It is a further object of the invention to provide a pick-up reel of the class described arranged for the ready assembly of the hubs on the axle and disassembly of the hubs therefrom.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

FIG. 2 is an end view of the reel, illustrating particularly the vertical orientation of the fingers which is at all times maintained during rotation of the reel.

FIG. 3 is a view similar to FIG. 2, but on an enlarged scale and with portions broken-away.

FIG. 4 is a sectional view taken at line 4—4 of FIG. 3.

FIG. 5 is an end view of one of the hubs of the reel and the mounting arrangement therefor.

FIG. 6 is an exploded perspective view on an enlarged scale of one of the control plates and hubs of the reel.

Figure 1:
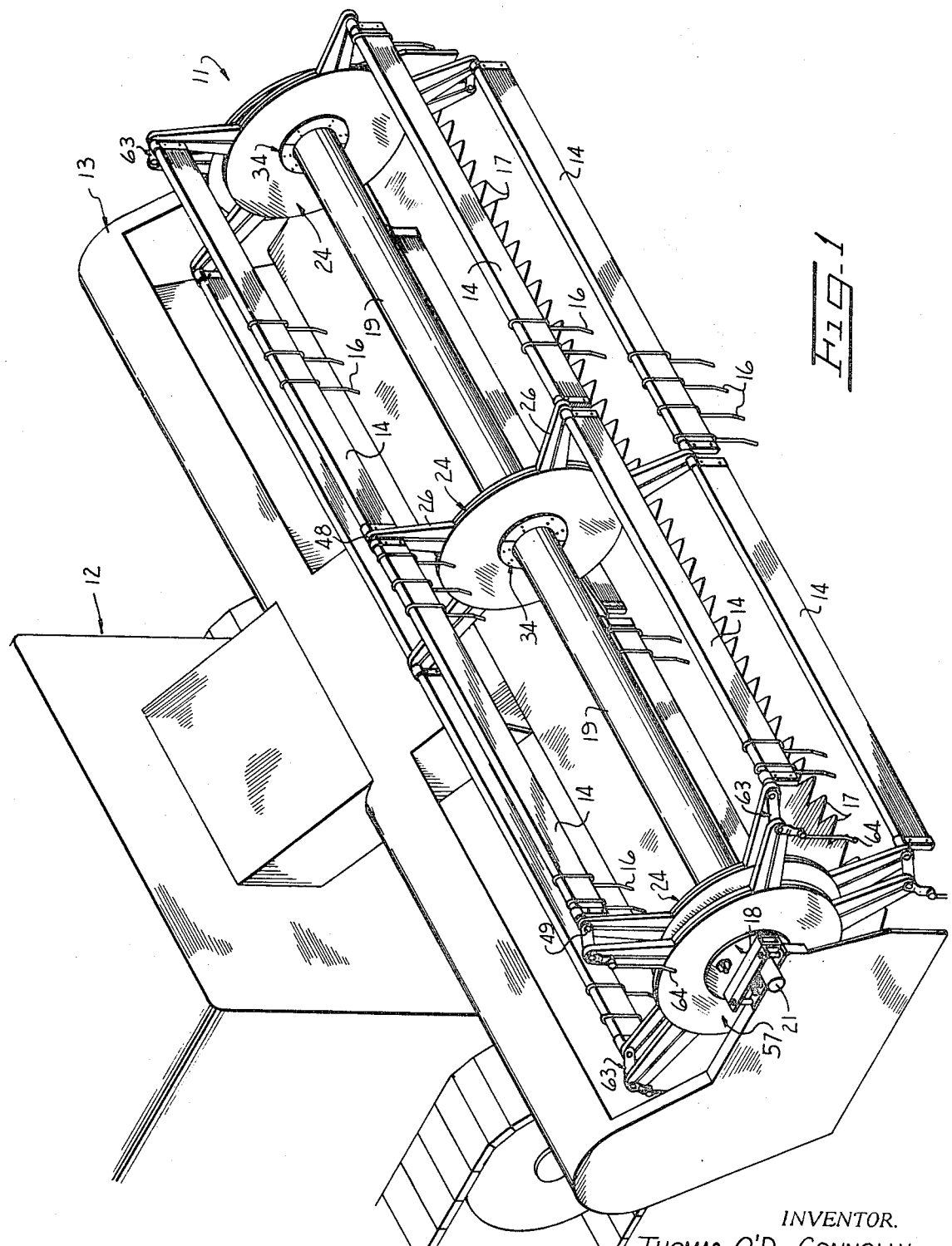
FIG. 1 is a perspective view of a pick-up reel in accordance with invention, illustrated in association with a harvesting vehicle, only a few of the pick-up fingers of the reel being shown in order to avoid obstructing the otherwise hidden parts of the reel.

Referring now to FIG. 1, there is shown an improved pick-up reel 11 in accordance with the present invention as mounted upon the front end of a harvesting vehicle 12, such as a swather, combine, or the like. More particularly, the vehicle is provided with a transverse mounting frame 13, and the reel is journalled between its opposite ends for rotation about a transverse horizontal axis. The reel includes a plurality of circumferentially spaced bats 14 in radially outwardly spaced relation to the reel axis, and each of the bats carries a plurality of longitudinally spaced fingers 16. Drive means (not shown) are coupled to the reel to rotate same in a clockwise direction, as viewed in FIG. 1, during forward movement of the vehicle. That is, the drive means rotates the reel so that the bats on the top of the reel are moving in the direction of forward movement of the vehicle and, as the reel rotates, the fingers on the lower bats enter a crop and sweep it rearwardly into the mounting frame into engagement with a cutting bar 17 mounted in fixed transverse position therein.

In accordance with the basic aspects of the invention, the reel 11 is of a relatively open construction substantially free of interior trusses and external polygonal bracing which would tend to tangle the crop and beat and shatter the seed heads in feeding the crop to the cutting bar 17. Yet, the reel is structurally very strong and rugged. In addition, the reel is provided at one or preferably at both its ends with an eccentric control plate and control hub assembly 18 for controlling the orientation of the bats 14 during reel rotation to maintain the fingers 16 at all times in a vertical or other selected position of inclination. The fingers therefore enter the crop with a downward stroke at the desired inclination and are thereafter maintained at such inclination to sweep the crop substantially horizontally rearward in an extremely gentle manner. To the foregoing purposes, the reel includes an inner tubular axle 19 from the opposite ends of which coaxial stub shafts 21 project. Preferably, each stub shaft has a pair of longitudinally spaced collars 22, 23 rigidly secured thereabout, as shown in FIG. 4. The stub shaft, with collars mounted thereon, extends into the end of the tubular axle 19 and the collars are peripherally rigidly secured to the interior wall of the axle. A plurality of annular hubs 24 are coaxially rigidly secured about the axle at longitudinally spaced positions, a pair of the hubs being respectively provided adjacent the opposite ends of the axle. Each hub is provided with a plurality of rigid circumferentially spaced radially projecting metallic drive arms 26, and the arms of the respective hubs are correspondingly longitudinally aligned. The bats 14 are respectively secured to the tips of the aligned sets of arms.

Considering now the preferred construction of the hubs and arms and manner of attachment of the hubs to the axle, reference is made to FIGS. 4 and 5 wherein it is seen that each hub is of dual disc construction. More particularly, each hub includes a pair of parallel and coaxial annular discs 27, 28. These discs are spaced from one another adjacent their bores and adjacent their outer peripheral edges respectively, by annular webs 29 and 30, extending right angularly therebetween. The webs 29 and 30 can be provided by abutting annular flanges extending inwardly adjacent the inner and outer periphery of each of the discs. The outer peripheral abutting flanges can be joined by welding and the inner abutting flanges are maintained in abutment by the pressure resulting from the bolted construction subsequently to be described. A plurality of collars 31 of rectangular, preferably tubular, cross section are rigidly secured, as by welding, coaxially about the axle at the desired longitudinally spaced positions. The hubs are respectively concentrically disposed about the collars 31 with the webs 29 engaging the peripheries thereof. The collars 31 are each provided with a plurality of circumferentially spaced bores 32 extending longitudinally therethrough. The hubs are each provided with a corresponding plurality of circumferentially spaced bores 33 extending longitudinally through the discs 27, 28 adjacent the web 29. Annular split collar plates 34, each comprising a pair of C-shaped elements 36, are in turn bolted to the opposite end faces of the collars 31 and exterior faces of the discs 27, 28 to thus rigidly secure the hubs to the axle. More particularly, the elements 36 are provided with an inner plurality of apertures 37 adapted to register with the bores 32 of collars 31 and an outer plurality of apertures 38 radially aligned with apertures 37 and adapted to register with the bores 33 of the hubs. With the elements 36 of the split collar plates 34 positioned on the axle with the apertures 37 in registration with bores 32 and the apertures 38 in registration with the bores 33, first and second pluralities of bolts 39, 41 are inserted through the respective registering sets of apertures and bores to threadably receive nuts 42 on their free ends.

The apertures 32, 33, 37 and 38 are not equally spaced about their respective members, but are in a predetermined positional pattern so that the above registration is only obtained when the hubs are so oriented angularly with respect to the collars that alignment of the drive arms of each hub assembly with the drive arms of the other hub assemblies is assured. This makes certain that the bats can be properly mounted between the hub assemblies in spaced parallel relation to the rotational axis of the reel. The positioning of the apertures 32, 33, 37 and 38 is also such that each of the hubs can be mounted to the collar with either disc 28 or disc 27 facing a particular end of the axle. By virtue of the predetermined pattern of the apertures, the split collar plates 34, and bolted construction, it will be appreciated that the hubs may be simply assembled on, and disassembled from the axle in an extremely simple and ready manner.

The drive arms 26 are preferably of rectangular cross section and arranged to fit snugly between the spaced discs 27, 28 of the hubs. Any suitable means may be provided for rigidly securing the arms to the hub. As here shown each hub is provided with a plurality of circumferentially spaced sets of bores 43 through the discs 27, 28 adjacent the periphery thereof. The bores 43 have a predetermined circumferential angular relationship to the bores 33 and register with bores 44 through the bases of the arms. Bolts 46 extend through the registering bores 43, 44 and threadably receive nuts 47 on their free ends to thus rigidly secure the arms to the hub. The bores 32 of the respective collars 31 are longitudinally aligned, and therefore when the hubs are assembled on the axle by means of the split collars 34, the sets of bores 43 are automatically indexed for securance of corresponding arms to the respective hubs in positions of longitudinal alignment by virtue of the just noted predetermined angular relationship between the bores 33 and 43.

The free ends of the drive arms 26 are respectively provided with bearings 48 for journalling pivot shafts 49 of the respective bats 14 to facilitate rotation thereof about longitudinal axes radially outwardly spaced from axle 19. The previously noted control plate and hub assemblies 18 are coupled to the pivot shafts and are operative to control rotation thereof in such a manner that the bats are at all times oriented to maintain the fingers 16 in a vertical or other selected position. Considering now the preferred structure of the assemblies 18 to the foregoing end, and referring particularly to FIGS. 2 and 3, it is to be noted that the control plate 51 of each assembly is provided with an aperture 52 through which a tubular bearing 53 extends. A plurality of rollers 54, preferably three, are journalled on one face of the plate for rotation about normal axes. The rotational axes of the rollers are disposed on a circle which is eccentric with respect to the rotational axis of the reel, that is shaft 21 which extends through bearing 53. Each roller is cylindrical and preferably formed with outwardly flared annular flanges 56 at its opposite ends. Journalling of the rollers is best facilitated by means of needle bearings. The rollers serve to support a control hub 57 of each assembly 18 for rotation about an axis which is eccentric with respect to bearing 53. The bearings 53 of the respective control plates journal the stub shafts 21 projecting from the opposite ends of the axle 19. In this manner, rotation of the control hubs is rendered eccentric relative to rotation of the axle, and therefore the hubs 24.

The control hubs 57 are similar to the hubs 24 in that they are of dual disc construction. Each control hub includes a pair of coaxially spaced annular discs 58, 59 interconnected adjacent their outer periphery by an annular web 60 extending right angularly therebetween. At the inner periphery of the discs is a web in the form of ring 61 which serves as a track in a manner subsequently described. A plurality of circumferentially spaced arms 62 project radially from the control hub, and such arms are rigidly secured between the discs 58, 59 in a manner analogous to that by which the arms 26 are secured between the discs 27, 28 of hubs 24. The control hub arms 62 correspond in number and angular spacing to the hub arms 26. The arms 62 as well as the arms 26 taper outwardly toward their inner end to provide a relatively large base portion for attachment to the hubs and thereby providing in combination with the hub structure and the axle 19 a very strong and rigid metal reel assembly.

The control hub is disposed with its web 61 engaging the peripheries of the central portions of the rollers 54 and the web is extended transversely slightly beyond the exterior faces of the discs so that the flanges 56 of the rollers will engage the web rather than the discs. Rotation of each control hub is facilitated by a plurality of L-cranks 63, respectively rigidly secured at one end in radially outwardly projecting relation to the ends of the bat pivot shafts 49 and pivotally secured adjacent their apices to the tips of the control hub arms 62. As the hubs 24 rotate with the axle 19, the control hubs 57 are rotated due to the cranks being coupled between the arms of the respective hubs. By virtue of the eccentric relation between the control hubs 57 and hubs 24, and the cranks 63 being rigidly secured to the bat pivot shafts, the bats are continuously pivoted as the reel rotates. The bat pivoting thus effected is such as to maintain the fingers 16 at all times vertical or at a selected inclination to the vertical. In addition, fingers 64 rigidly carried by the second ends of the cranks are simultaneously maintained at the selected inclination at all times.

Mounting of the reel in the frame 13 of the harvesting vehicle 12 is preferably accomplished by means of a bracket 66 and spacer element 67 secured to each control plate 51. The mounting bracket 66 is of channel configuration adapted to be bolted to the frame. A circular aperture 68 is provided in the web of the bracket, as are a pair of spaced-apart arcuate slots 69, 71 concentric with the aperture. The spacer element 67 is preferably of tubular rectangular configuration and provided with aligned circular apertures 72 in opposed walls thereof adapted to register with the bracket aperture 68. Aligned arcuate slots 73 are provided in such opposed walls of the spacer element and adapted to register with bracket slot 69, while a plurality of arcuately spaced apertures 74 are provided to register with bracket slot 71. Each control disc 51 is provided with a pair of arcuate slots 76, 77 concentric with bearing 53 and adapted to register with the bracket slots 69, 71. In the mounting of the reel 11, the brackets 66 are secured to the mounting frame 13 with the spacer elements 67 interposed between the brackets and control plates 51. The bearing 53 of each control plate is received by the spacer element apertures 72 and bracket aperture 68 and is rigidly secured therein to provide a firm support for the bearing. A pair of bolts 78, 79 respectively extend through the control plate apertures 76, 77, spacer elements slots 73 and one set of the apertures 74, and bracket slots 69, 71. The bolts receive washers 81 and threadably engage nuts 82 which when tightened secure the control plate, spacer element, and bracket in rigid assembly. The nuts are preferably elongated, as shown, in order to be readily accessible to a wrench or the like. It is particularly important to note, that when the nuts 82 are loosened, the control plates may be pivoted about the axis of bearing 53 within the full range of the slots 76, 77 to in turn vary the position of the rotational axis of the control hubs 57 with respect to the rotational axis of the reel. As a result, the axis of the control hubs may be adjusted to control the bat orientation and thus the angle or inclination of the fingers 16 during rotation of the reel. Because of this ready adjustment, over an extensive range of the angular positioning of the fingers, the reel is adaptable in a simple manner for use with many different crop and crop conditions. Thus, for example when a crop is lying down the fingers can readily be inclined to extend the lower portions of the fingers toward the cutting mechanism to accentuate the picking-up ability of the reel.

It will be appreciated that the spacer elements 67 could be eliminated, or a plurality of spacers may be employed, in order to adapt the reel to use with mounting frames of different widths.

After sustained use of the reel, some wear is produced between the rollers 54 and webs or tracks 61 of the control hubs 57. When the wear becomes excessive, a wobbly fit results. This problem is overcome in the reel of the present invention by mounting one of the rollers 54' for selective movement outwardly of the circle upon which the rollers are disposed. As wear increases, the roller may be progressively moved outward to compensate for the wear and reestablish a tight fit between the rollers and control hub. More particularly, roller 54' is preferably eccentrically mounted for rotation upon a centrally pivoted disc 83. Upon rotation of the disc, the position of the roller 54' is varied with respect to the circle upon which the rollers are mounted. Bolts 84 may be tightened to set the disc 83 in any desired position wherein the roller 54' snugly engages the web 61 of the control hub 57.

What is claimed is:

1. A pick-up reel for harvesting machinery comprising an axle, a plurality of annular reel hubs rigidly coaxially secured to said axle at longitudinally spaced positions thereof, a plurality of circumferentially spaced rigid reel arms projecting radially outward from each of said reel hubs, corresponding ones of the arms of the respective hubs being longitudinally aligned, a plurality of bats respectively pivotally mounted at the tips of the aligned ones of said arms for movement about longitudinal axes, a plurality of fingers projecting from each of said bats, mounting means adapted for attachment to a harvesting vehicle to journal said axle therein for rotation about a generally horizontal axis and including a control plate, a control hub mounted on said control plate for rotation about an eccentric axis with respect to the rotational axis of said axle, a plurality of circumferentially spaced rigid metallic arms projecting radially outward from said control hub, and a plurality of cranks rigidly secured to the ends of said bats in radially projecting relationship thereto and pivotally connected to the tips of said arms of said control hub to pivot said bats to positions wherein a selected positional inclination of said fingers thereof are maintained during rotation of said axle, said hubs each including a pair of coaxially spaced annular discs, a plurality of annular collars of rectangular cross section rigidly coaxially secured to said axle at longitudinally spaced positions thereof, said reel hubs respectively coaxially disposed upon said collars with the inner edges of said hubs snugly engaging the peripheries of said collars, a pair of collar plates disposed about said axle respectively in engagement with the opposite side faces of each of said collars and the exterior faces of said discs of the corresponding reel hub disposed on said collar, each of said collars having a plurality of circumferentially spaced bores therethrough, said discs of each reel hub having a corresponding first plurality of circumferentially spaced bores therethrough, each of said collar plates having first and second pluralities of circumferentially spaced apertures respectively registering with the bores of said collar and bores of said discs, a first plurality of bolts extending through said first plurality of apertures of said collar plates and said bores of said collar and threadably receiving nuts, a second plurality of bolts extending through said second plurality of apertures of said collar plates and said bores of said discs and threadably receiving nuts, said arms having a rectangular cross section and being interposed between said discs of each reel hub, said discs having a plurality of circumferentially spaced sets of second bores registering with bores of said arms, and a third plurality of bolts extending through said sets of bores of said discs and bores of said arms and threadably receiving nuts.

2. A pick-up reel according to claim 1, further defined by said sets of second bores of said discs of the respective reel hubs having a predetermined angular relationship to said first bores thereof.

3. A pick-up reel for harvesting machinery comprising a tubular axle; a pair of annular reel hubs rigidly coaxially secured to said axle at opposite ends thereof, each of said annular reel hubs being of dual disc construction and including a pair of spaced parallel annular discs coaxially mounted on said tubular axle, said discs of each of said reel hubs being interconnected adjacent their inner and outer peripheries by annular webs which extend right angularly between said discs to provide with said discs a hollow, structurally strong construction; a plurality of circumferentially spaced rigid reel arms projecting radially outward from between the spaced discs of each of said reel hubs with corresponding ones of said arms of the respective hubs being longitudinally aligned, each of said arms being rigidly secured between said discs to provide with said tubular axle and dual disc reel hub construction a rigid yet light pick-up reel structure; a plurality of bats respectively pivotally mounted at the tips of the aligned ones of said arms for movement about longitudinal axes, a plurality of fingers projecting from each of said bats, mounting means adapted for attachment to a harvest vehicle to journal said axle therein for rotation about a generally horizontal axis and including a control plate, a control hub mounted on said control plate for rotation about an eccentric axis with respect to the rotational axis of said axle, a plurality of circumferentially spaced arms projecting radially outward from said control hub, and a plurality of cranks rigidly secured to the ends of said bats in radially projecting relationship thereto and pivotally connected to the outer tips of said arms of said control hub to pivot said bats during the rotation of said pick-up reel to maintain a selected positional inclination of said fingers during such rotation.

4. A pick-up reel according to claim 3 wherein each of said arms projecting radially outward from between the discs of each of said reel hubs is of metallic construction, has a rectangular cross section, and tapers outwardly toward its inner end to provide a relatively large base portion between said discs for rigid securance therebetween.

5. A pick-up reel according to claim 3, further defined by said control hub being of annular configuration and a plurality of rollers being journalled on said control plate for rotation about axes normal thereto, said rollers being disposed on a circle eccentrically related to the axis of said axle and said control hub being disposed with its bore surface engaging the peripheries of said rollers, and one of said rollers being mounted for selective movement to different radial positions of said circle.

6. A pick-up reel according to claim 5, further defined by said control plate having a tubular bearing projecting therefrom at an eccentric position relative to said circle, a stub shaft projecting coaxially from the end of said axle rotatably received by said bearing of said control plate, said mounting means including a mounting bracket having an aperture receiving said bearing and a pair of radially spaced arcuate slots concentric with reference to the bracket aperture, said bracket adapted for fixed attachment to a harvesting vehicle, said control plate having a pair of radially spaced arcuate slots concentric with reference to said bearing and registering with said slots of said bracket, and a pair of bolts respectively extending through the registering slots of said plate and bracket and threadably receiving nuts on their free ends.

7. A pick-up reel according to claim 3, further defined by said control hub including parallel coaxially spaced annular discs interconnected adjacent their bores by an annular web extending right angularly therebetween, said arms of said control hub interposed between said discs thereof and secured thereto, said rollers having outwardly flared annular flanges at their opposite ends, and said web of said control hub engaging the reduced portions of said rollers.

8. A pick-up reel for harvesting machinery comprising an axle; a plurality of annular collars rigidly coaxially secured to said axle at longitudinally spaced positions thereof; a plurality of annular reel hubs, each of which has a plurality of circumferentially spaced rigid reel arms projecting radially outward therefrom, and each of which is respectively coaxially disposed upon one of said collars with the inner periphery of each of said reel hubs in snug engagement with the outer periphery of its corresponding collars, each of said collars having a plurality of circumferentially spaced bores therethrough and each of said reel hubs having a corresponding first plurality of circumferentially spaced bores therethrough; a pair of collar plates respectively in engagement with the opposite side faces of each of said collars and the exterior faces of the corresponding reel hub disposed on said collar, each of said collar plates having first and second pluralities of circumferentially spaced apertures respectively registering with the bores of said collar and bores of said hubs; a first plurality of bolts extending through said first plurality of apertures of said collar plates and said bores of said collar and threadably receiving nuts, a second plurality of bolts extending through said second plurality of said apertures of said collar plates and said bores of said discs and threadably receiving nuts, said bores through said collars and through said reel hubs having a predetermined positional pattern relative to said apertures through said collar plates so that registration of said apertures simultaneously with both the bores of said collars and said reel hubs are only obtained when the hubs are so oriented angularly with respect to the collars that the reel arms projecting radially from each of the hubs is longitudinally aligned with the reel arms of the other hubs, a plurality of bats respectively pivotally mounted at the tip of the aligned ones of said arms for movement about longitudinal axes, a plurality of fingers projecting from each of said bats, and mounting means for journalling said axle to a harvesting vehicle for rotation about a generally horizontal axis.

9. A pick-up reel according to claim 8 wherein each of said reel hubs include a pair of coaxially spaced annular discs with the inner ends of said drive arms being interposed therebetween, said discs having a plurality of circumferentially spaced sets of second bores registering with bores of said arms and a third plurality of bolts extending through said second set of bores of said discs and the bores of said arms and threadably receiving nuts, said set of second bores of said discs of the respective reel hubs having a predetermined angular relationship to the first set of plurality of bores through said hubs to assure said longitudinal alignment of the arms of said spaced hubs.

10. A relatively lightweight high-strength pick-up reel for harvesting machinery, comprising: a longitudinally extending tubular axle intended to be horizontally disposed; a plurality of reel hubs rigidly secured to said axle in coaxial relation therewith at longitudinally spaced positions therealong and extending a substantial distance radially outwardly from said axle; each of said hubs being equipped with a plurality of angularly spaced reel arms freely projecting radialy outwardly therefrom and each of said arms having a tapered configuration increasing in angular extent from a restricted outer free end toward an enlarged base adjacent the mergence thereof with the associated hub; a plurality of bats each equipped with a plurality of pick-up fingers projecting therefrom in longitudinally spaced substantially parallel relation, said bats being respectively disposed between longitudinally aligned pairs of successive arms and being pivotally supported thereby adjacent the outer free ends thereof for movement about axes substantially parallel to said axle; mounting means for attachment to a harvesting vehicle to support said axle with respect thereto for rotation about its longitudinal axis, and control means for pivoting said bats during rotation of said reel to position said pick-up fingers in a predetermined orientation for interception of a crop to be engaged and raised thereby; each of said hubs and each of said arms being relatively thin metal components having at least one web lying along a plane of generally radial orientation relative to said axle and also having at least one flange integral with said web and extending generally long the longitudinal axis of said axle so that each hub and arm has substantial resistance to flexure in both radial and longitudinal directions; said reel being essentially devoid of reinforcing structure interconnecting the arms of any one hub radially outwardly therefrom and also of reinforcing structure extending in longitudinal directions from any one arm generally toward the next successive hub.

11. A pick-up reel according to claim 10 in which each of said hubs extends radially outwardly from said axle a distance at least equal to substantially oue-half the radial distance between said axle and the outer free end of each of said arms at the position of its mergence therewith.

12. A pick-up reel according to claim 11 in which each of said arms is a structurally separate component extending radially inwardly toward said axle from the periphery of the associated hub and is fixedly secured thereto in a cantilever manner at a plurality of radial positions therealong.

References Cited
UNITED STATES PATENTS

| | | | |
|---|---|---|---|
| 241,669 | 5/1881 | Keller | 56—226 |
| 3,338,036 | 8/1967 | Hurlburt | 56—227X |

LOUIS G. MANCENE, Primary Examiner

J. A. OLIFF, Assistant Examiner